Dec. 25, 1928.  
G. J. RACKHAM  
BRAKE FOR VEHICLES  
Filed Oct. 23, 1925

Inventor  
George John Rackham

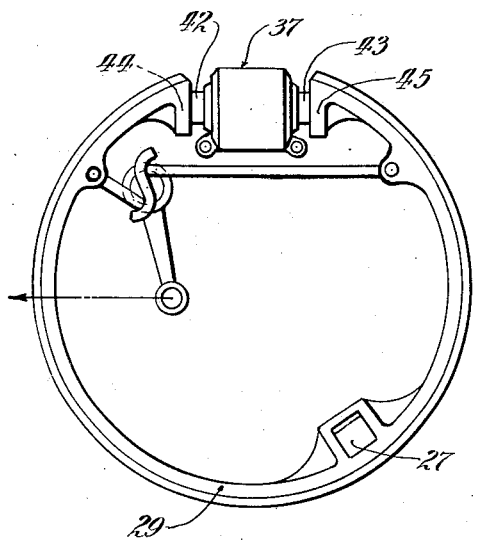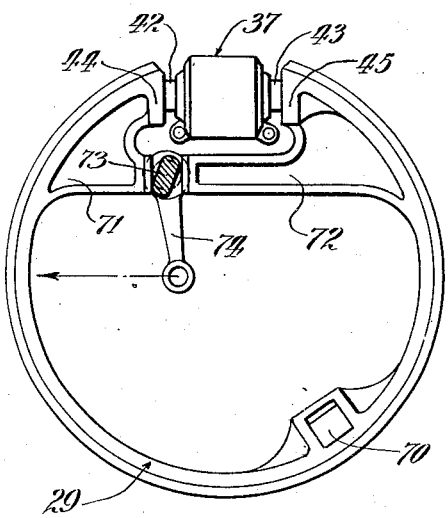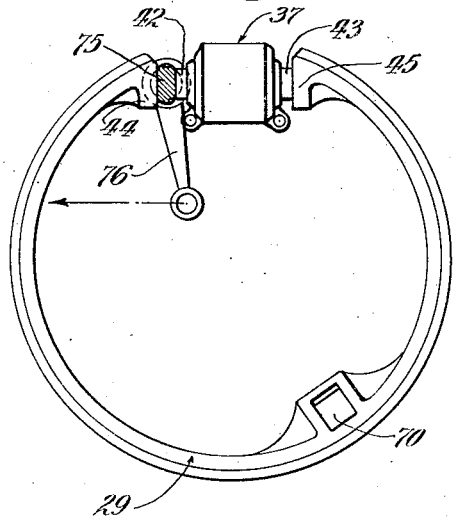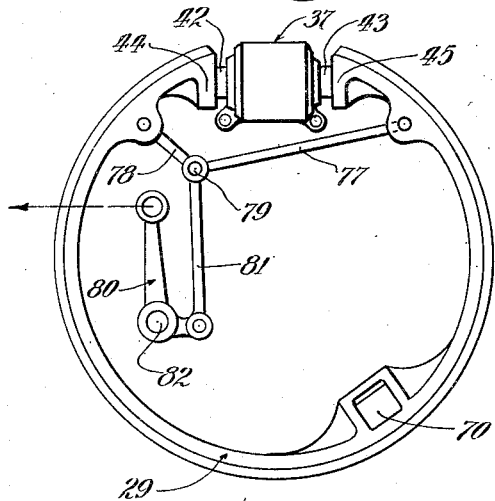

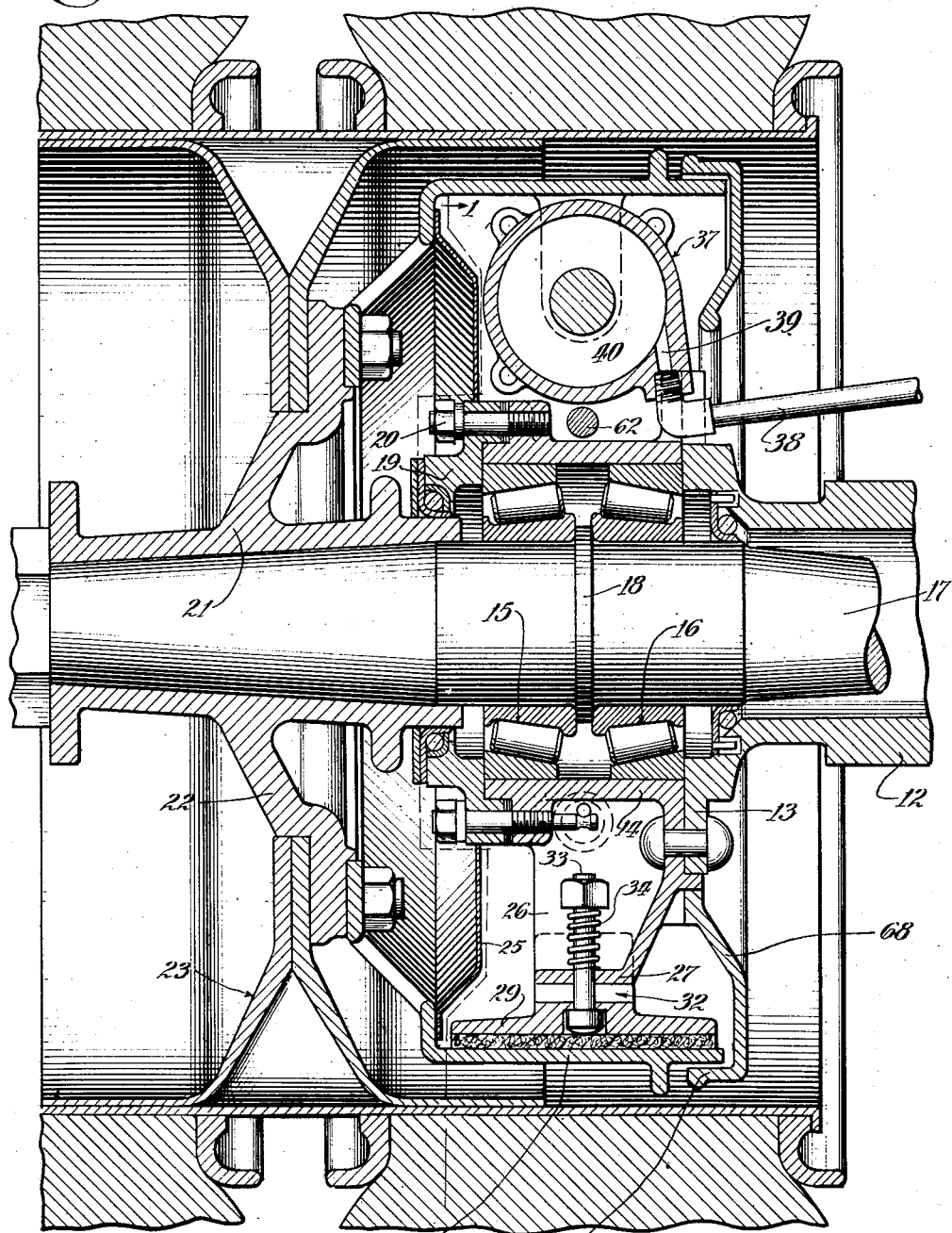

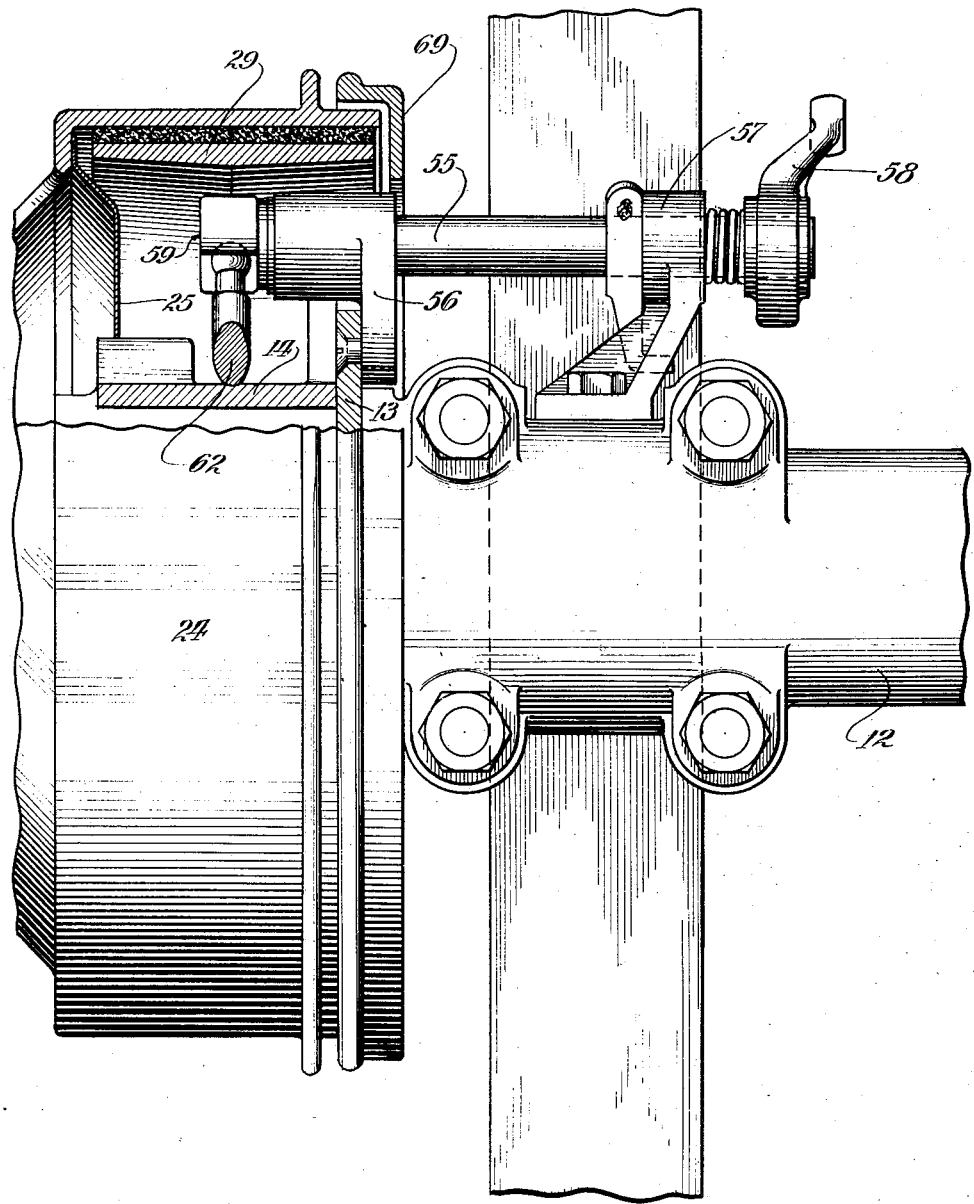

Dec. 25, 1928. 1,696,729
G. J. RACKHAM
BRAKE FOR VEHICLES
Filed Oct. 23, 1925   5 Sheets-Sheet 5
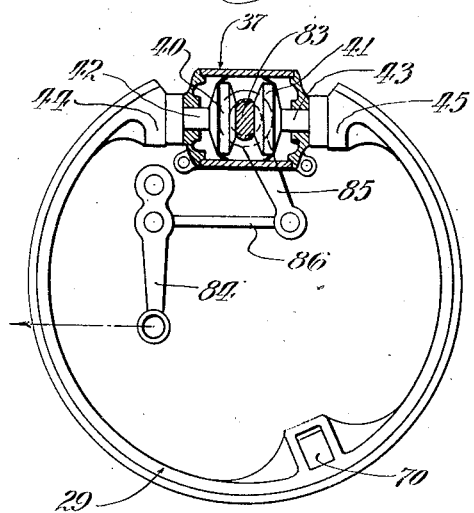
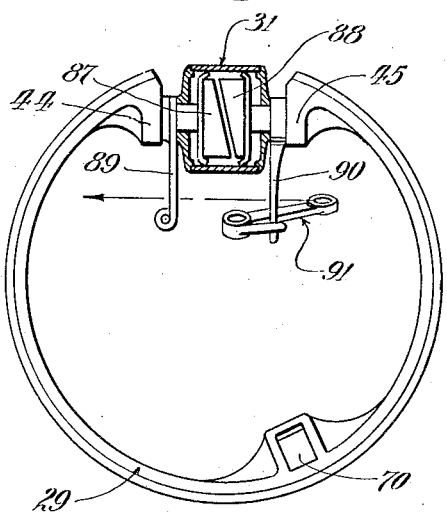
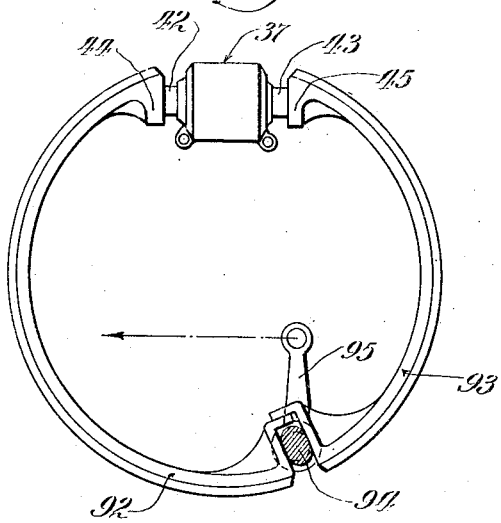
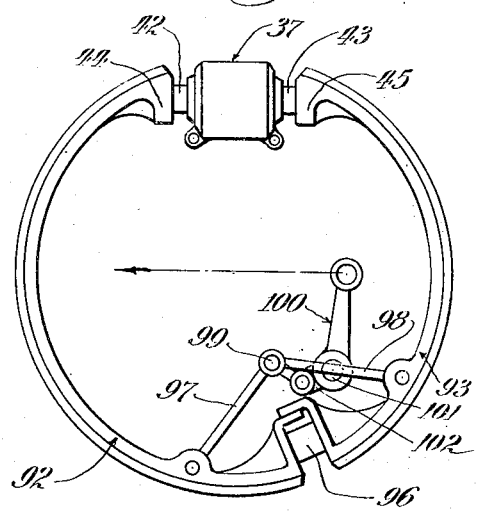

Patented Dec. 25, 1928.

1,696,729

UNITED STATES PATENT OFFICE.

GEORGE JOHN RACKHAM, OF CHICAGO, ILLINOIS, ASSIGNOR TO YELLOW COACH MANUFACTURING COMPANY, OF CHICAGO, ILLINOIS, A CORPORATION OF ILLINOIS.

BRAKE FOR VEHICLES.

Application filed October 23, 1925. Serial No. 64,292.

This invention has to do with certain improvements in brakes for vehicles and the like. The invention has reference particularly to improvements in fluid operated brakes, such as air brakes, for relatively large and heavy motor vehicles, particularly busses, coaches, trucks and the like. It will be understood, however, that the features of the invention are not limited to the foregoing particular classes of service.

One of the objects of the invention is to provide a fluid operated brake, such as an air brake, wherein there is also provided an emergency operating device working on the same brake shoe or shoes. In other words, to make provision for the use of one and the same shoe or shoes for both the power operated service brake and the emergency brake.

More particularly it is an object of the invention to provide a construction in which the operating mechanism for the emergency operation is relatively compact and may be placed within the same brake drum and adjacent to the fluid cylinder itself.

Still another feature of the invention relates to the provision of a very compact and simple structure for accommodating the brake mechanism. A further object, in this connection, is to provide a simple and very efficient means for ensuring normal disengagement of the brake shoe from the drum all around the periphery when the brake is released. Also to provide a very simple and effective adjusting device for use in connection with the foregoing.

A further object of the invention relates to the provision of an improved construction of anti-rattle device which will effectively prevent rattle of the brake shoe due to side movements.

Other objects and uses of the invention will appear from a detailed description of the same, which consists in the features of construction and combinations of parts hereinafter described and claimed.

In the drawings:

Fig. 1 may also be considered a section on the line 1—1 of Fig. 2, looking in the direction of the arrows;

Fig. 2 is a longitudinal section on the line 2—2 of Fig. 1, looking in the direction of the arrows;

Fig. 3 is a plan view of the brake mechanism, a portion thereof being cut away so as to better illustrate the emergency operating mechanism; and Figs. 4, 5, 6, 7, 8, 9, 10 and 11 are diagrammatic illustrations of various modified forms of construction.

Figure 1:
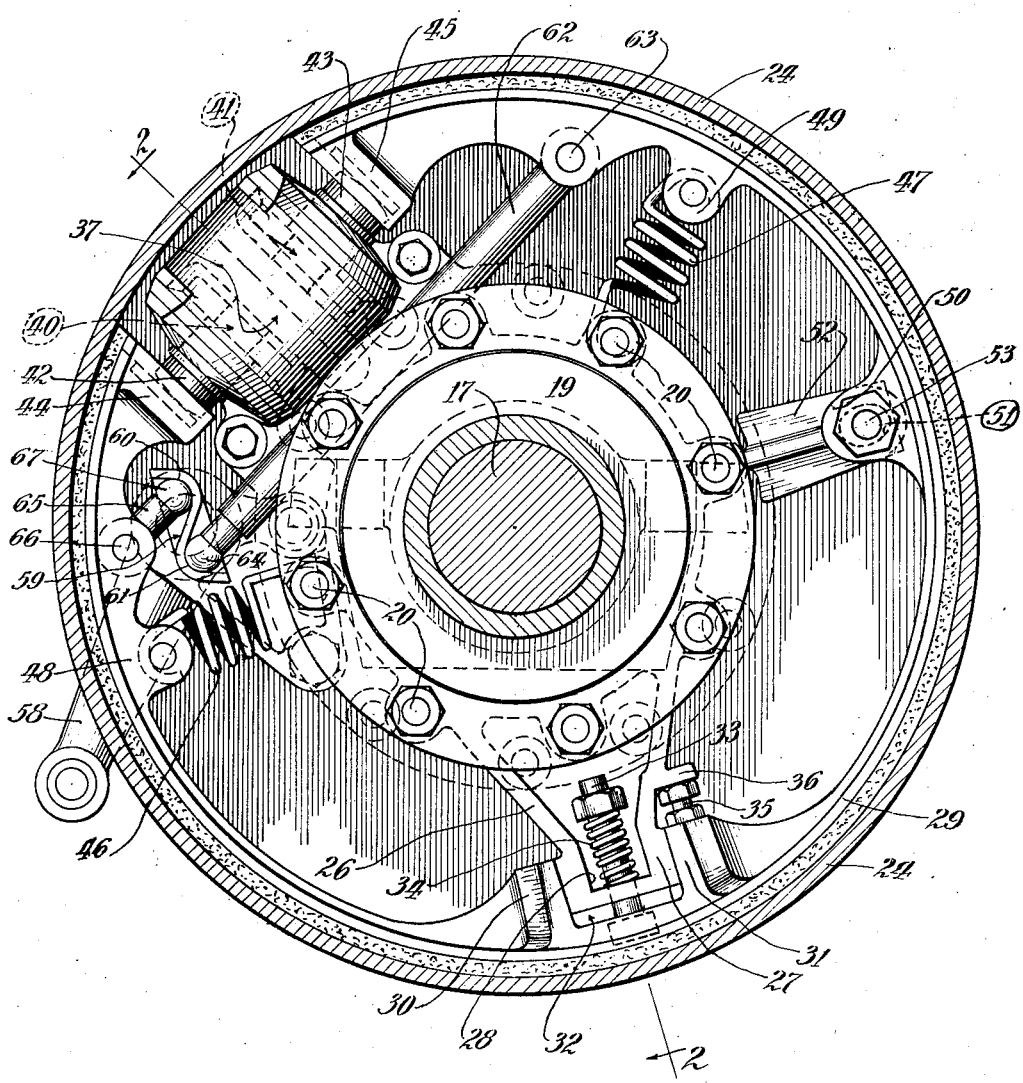
Figure 1 shows a cross section through the brake drum adjacent to the operating mechanism and illustrates the shoe and the air cylinder as well as the mechanical operating mechanism.

In the construction shown in Figs. 1, 2 and 3, the axle shaft housing 12 is provided with a flange 13 at its outer end. To this flange is secured a hub 14. Said hub serves as a housing for the roller bearings 15 and 16 for the axle shaft 17. The axle shaft is provided with the usual flange 18 between the positions of the roller bearings, and the housing 14 is closed by the end plate 19 which is bolted thereto by the machine screws 20.

The wheel hub 21 is secured to the end of the axle shaft in any of the well understood manners. This wheel hub is provided with the flange 22 to which is secured the wheel designated in its entirety by the numeral 23. The flange 22 carries the inwardly reaching brake drum 24, said brake drum being either continuous in its connection to the flange 22, or provided with suitable ventilating openings. In the latter case, it is preferred that a guard plate 25 be placed around the inside of the brake drum opposite to the position of the flange 22.

The hub 14 is provided at one side with a radial enlargement 26, best shown in Figs. 1 and 2. The outer end of this enlargement preferably terminates in the form of a rectangular head 27, the same being countersunk, as shown at 28 in Fig. 1. The metal brake shoe itself is designated by the numeral 29. Adjacent to its central portion, it is provided with a pair of inwardly reaching lugs 30 and 31 which embrace the sides of the head 27. The parts are so arranged as to establish a sufficient clearance 32 between the metal brake shoe and the end of the head 27 to allow for all necessary movements in the setting and releasing of the brake.

A pin 33 reaches radially inward from the brake shoe and into the hollowed out portion 28 of the radial boss 26. A spring 34 tends to draw this pin 33 inwards and thus to draw the central portion of the brake shoe itself away from the drum 24. This movement, if carried to an extreme degree, would result in causing the diametrically opposite portions of the brake shoe to bind against the drum. In order to avoid this, I provide an adjustable stop 35 intermediate between the central portion of the brake shoe and a suitable lug 36 on the radial boss 26. This adjustable stop preferably takes the form of a machine screw threaded onto one of the elements and locked by a suitable lock screw making a very convenient form of adjustment. This stop will prevent an excessive lateral shifting of the brake shoe under the force of the spring 34.

At a position substantially opposite to that of the radial boss 26 there is located the air cylinder 37. This air cylinder is carried by a suitable bracket on the hub 14, and is, therefore, rigid. An air connection 38 reaches outwards from the cylinder 37 to a suitable control connection. Preferably, the air opening 39 in the cylinder 37 is substantially tangential, as shown in Fig. 2, so that the delivery and release of the air will not tend to drain oil from the interior of the cylinder.

Within the cylinder 37 is a pair of plungers 40 and 41 preferably provided with oppositely disposed cup leathers, so that when air is introduced between these plungers they are forced apart to set the brake. These plungers have the pins 42 and 43 reaching to the outside of the cylinder 37 and adapted to bear against the end blocks 44 and 45 of the metal brake shoe.

In order to automatically release the brake when the air pressure is released, I provide a pair of springs 46 and 47 reaching radially from lugs 48 and 49 on the brake shoe to suitable points of anchorage on the hub 14. It will be noted that these springs are located substantially 120° apart, so that together with the spring 34 they tend to establish a very effective release of the brake shoe all around the periphery.

At one point, preferably well removed from the ends of the brake shoe, said brake shoe is provided with a lug 50 having a relatively large oval opening 51. A bracket 52 reaches radially outwards from the hub 14 to a position alongside of the lug 50; and a pin 53 reaches from said bracket 52 to said opening 51 and carries a lock nut 54 on its opposite end by means of which the lug 50 is held in frictional contact with the bracket 52. The amount of such frictional engagement is, however, not sufficient to materially interfere with the normal operation of the brake shoe, but it will effectively eliminate rattle.

Reaching into the brake drum and inside of the brake shoe at a position relatively close to the air cylinder 37 is a rock shaft 55. Said rock shaft is preferably journaled within a bracket 56 carried by the flange 13, already referred to, or an extension thereof. This rock shaft also finds another bearing at a point 57 in the form of a bracket reaching outwards from the axle shaft housing 12. A suitable crank 58 on the rock shaft 55 serves as a convenient means for operating the emergency brake.

The inner end of the rock shaft 55 carries a head 59, the form of which is best shown in Fig. 1. Said head has a pair of oppositely disposed sockets 60 and 61 at opposite sides of the axis of rotation. A link 62 has one end pivoted to the brake shoe at the point 63 near one end of the shoe, and the other end 64 of said link is formed as a ball seated within the socket 61. Another link 65 is pivoted to the shoe at the point 66 near the other end thereof, said link 65 having a head 67 which seats into the socket 60. As a result of this construction, the rocking of the shaft 55 serves to separate the links 62 and 65 thereby effectively expanding the brake shoe and setting it. During such operation, the end portions of the brake shoe are allowed to pull away from the pins 42 and 43 of the cylinder plungers already referred to.

It will be noted that with this construction the emergency operation of the brake shoe is performed at points very close to the normal application of power, so that practically a full amount of braking effort is available and under conditions closely approximating the normal operating conditions of the brake shoe when used as a service brake. At the same time, the construction is such that the emergency operating mechanism is extremely simple and compact, composed of very few parts and readily assembled into the space which would otherwise be unoccupied and unused.

The open side of the brake drum 24 is preferably enclosed and protected by the usual shield 68, the periphery 69 of the same being turned over to a position close to the outside of the brake drum 24 which it slightly overlaps. The arrangements of Figs. 1, 2 and 3, is shown diagrammatically in Fig. 4.

In the modified arrangement of Fig. 5, the central portion of the brake shoe 29 is anchored on the stationary block 70. The end portions of the brake shoe are provided with inwardly reaching lugs 71 and 72 between which is located a cam block 73 which can be operated by a swinging arm 74. This arrangement is similar to that of Fig. 4, with the exception of the particular method of establishing connection to the end portions of the brake shoe.

In the modified arrangement of Fig. 6, the central portion of the brake shoe is anchored on the block 70, but in the present case a cam block 75 is located between one end of the brake shoe and one of the power plungers, said cam block being operated by the arm 76.

In the modified arrangement shown in Fig. 7, the brake shoe 29 has its central portion anchored on the block 70. Its ends are connected by a pair of toggle links 77 and 78 which are joined together on the pin 79. This pin is connected to a bell crank 80 by a link 81, the bell crank being pivoted at the point 82. Operation of the bell crank serves to straighten out the two toggle links and thus set the brake shoe.

In the modified construction of Fig. 8, the brake shoe 29 has its central portion anchored at the point 70. In the present case, however, a cam block 83 is located within the air cylinder being operated by a rock shaft reaching through the cylinder wall. This cam block is located directly between the plungers and serves to separate them mechanically when the shaft is rocked. The shaft can be rocked by means of an arm 84 operating on a shaft arm 85 through the medium of a link 86.

In the modified construction of Fig. 9, the brake shoe 29 has its central portion anchored at the point 70. In this case the two cylinder plungers 87 and 88 have companion cam surfaces formed on their adjoining faces. One or both of the plungers can be rotated from the outside of the cylinder. In the particular construction illustrated, the plunger 87 is anchored by a link 89, so that it cannot rotate, but the plunger 88 is provided with a rock arm 90 connected to a bell crank 91 by which it can be rocked.

In the particular construction of Fig. 10, the brake shoe is divided at the anchor end into the sections 92 and 93. Between these is placed a cam block 94 which can be rotated by the operating arm 95. Normally, the brake shoes are separated by the air pressure, their opposite ends merely pivoting on the cam block 94, but in the emergency operation, the cam block is rotated so that the first mentioned ends of the brake shoes pivot on the projecting portions of the plungers.

In the modified construction of Fig. 11, the end portions of the brake shoes are normally anchored against a block 96. These end portions are then joined by a pair of toggle links 97 and 98 connected by a pin 99. A bell crank 100 pivoted at the point 101 operates on the pin 99 through the medium of a link 102. In this construction also, the brake shoes normally swing on the fixed block 96, but in emergency operation its ends are separated by the toggle link structure and the shoes swing on the projecting portions of the air plungers.

While I have herein shown and described only certain embodiments of the features of my present invention, still I do not intend to limit myself to the same, except as I may do so in the claims.

I claim:

1. The combination with the axle housing and wheel hub of a motor vehicle, of an inwardly reaching brake drum secured to the wheel hub, a radially extending abutment on the axle housing and within the brake drum, a fluid cylinder secured to the axle housing at a position within the brake drum and having its axis extending tangentially at the position of the cylinder, a circular brake shoe within the drum reaching past the position of the radial abutment and having its ends terminating adjacent to the ends of the cylinder, inwardly reaching lugs on the brake shoe slidably embracing the radial abutment, spring means tending to force the shoe radially inwards at the position of the abutment, adjustable means for limiting such movement, spring means tending to force the end portions of the shoe radially inwards, a pair of oppositely working plungers within the cylinder, operative connections between said plungers and the ends of the brake shoe, a pair of links connected to the end portions of the brake shoe at points adjacent to the plunger connections aforesaid, and means for forcing said links apart to thereby set the brake independently of fluid pressure within the cylinder, substantially as described.

2. The combination with the axle housing and wheel hub of a motor vehicle, of a brake drum, a radially extending abutment within the brake drum, a fluid cylinder within the brake drum and having its axis extending tangentially at the position of the cylinder, a circular brake shoe within the drum reaching past the position of the radial abutment and having its ends terminating adjacent to the ends of the cylinder, inwardly reaching lugs on the brake shoe slidably embracing the radial abutment, spring means tending to force the shoe radially inwards at the position of the abutment, adjustable means for limiting such movement, spring means tending to force the end portions of the shoe radially inwards, a pair of oppositely working plungers within the cylinder, operative connections between said plungers and the ends of the brake shoe, a pair of links connected to the end portions of the brake shoe at points adjacent to the plunger connections aforesaid, and means for forcing said links apart to thereby set the brake independently of fluid pressure within the cylinder, substantially as described.

3. The combination with the axle housing and wheel hub of a motor vehicle, of a brake drum, a radially extending abutment within the brake drum, a fluid cylinder within the brake drum and having its axis extending tangentially at the position of the cylinder, a circular brake shoe within the drum reaching past the position of the radial abutment and having its ends terminating adjacent to the ends of the cylinder, means on the central portion of the brake shoe cooperating with the radial abutment to prevent rotary movement of the brake shoe while permitting radial movement thereof, spring means tending to force the shoe radially inwards at the position of the abutment, adjustable means for limiting such movement, spring means tending to force the end portions of the shoe radially inwards, a pair of oppositely working plungers within the cylinder, operative connections between said plungers and the ends of the brake shoe, a pair of links connected to the end portions of the brake shoe at points adjacent to the plunger connections aforesaid, and means for forcing said links apart, to thereby set the brake independently of fluid pressure within the cylinder, substantially as described.

GEORGE JOHN RACKHAM.